United States Patent
Kim et al.

(10) Patent No.: US 8,317,995 B2
(45) Date of Patent: Nov. 27, 2012

(54) ELECTRODE TOOL FOR ELECTROCHEMICAL MACHINING AND METHOD OF MANUFACTURING THE SAME

(75) Inventors: Young Tae Kim, Seoul (KR); Young Hwan Lim, Gyunggi-do (KR); Il Oung Park, Seoul (KR); Won Seok Choi, Gyunggi-do (KR); Jong Yun Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1078 days.

(21) Appl. No.: 12/285,878

(22) Filed: Oct. 15, 2008

(65) Prior Publication Data
US 2009/0314653 A1    Dec. 24, 2009

(30) Foreign Application Priority Data
Jun. 23, 2008    (KR) .................. 10-2008-0059065

(51) Int. Cl.
*B23H 7/22*    (2006.01)
(52) U.S. Cl. .................................. 205/640; 204/224 M
(58) Field of Classification Search .................. 205/640; 204/224 M
See application file for complete search history.

(56) References Cited

U.S. PATENT DOCUMENTS
2005/0082173 A1 * 4/2005 Oelsch ........................ 205/640
2007/0144917 A1 * 6/2007 Yasuda et al. ................ 205/649

FOREIGN PATENT DOCUMENTS
JP    2003340648 A   * 12/2003
KR    10-755278         8/2007

OTHER PUBLICATIONS
Korean Office Action issued Jun. 17, 2010 in corresponding Korean Patent Application 10-2008-0059065.

* cited by examiner

*Primary Examiner* — Nicholas A. Smith

(57) ABSTRACT

Disclosed herein is a highly-durable electrode tool for electrochemical machining, which can prevent the corrosion and abrasion of a conductive pattern at the time of electrochemical machining for forming dynamic pressure-generating grooves of a fluid dynamic bearing, and a method of manufacturing the same. The electrode tool for electrochemical machining includes: an electrode substrate on which a conductive pattern is formed to have protrusions corresponding to the fine grooves and to which negative current is applied; a nonconductive insulating layer, covering an entire top surface of the electrode substrate excluding the conductive pattern; and a conductive layer, which is formed on the conductive pattern to protect the conductive pattern, and a top surface of which is the same height as a top surface of the nonconductive insulating layer.

5 Claims, 5 Drawing Sheets

ELECTRODE TOOL FOR ELECTROCHEMICAL MACHINING AND METHOD OF MANUFACTURING THE SAME

CROSS REFERENCE TO RELATED APPLICATION

This application claims the benefit of Korean Patent Application No. 10-2008-0059065, filed Jun. 23, 2008, entitled "Electrode Tool for the Electro chemical Machining and Method for Manufacturing the Electrode Tool", which is hereby incorporated by reference in its entirety into this application.

BACKGROUND OF THE INVENTION

1. Field of the Invention

The present invention relates to an electrode tool for electrochemical machining and a method of manufacturing the same, and, more particularly, to a highly-durable electrode tool for electrochemical machining, which can prevent the corrosion and abrasion of a conductive pattern at the time of electrochemical machining for forming dynamic pressure-generating grooves of a fluid dynamic bearing, and a method of manufacturing the same.

2. Description of the Related Art

Electrochemical machining (ECM) is a method of etching fine grooves in a metallic material, which is a workpiece, by removing a metal oxide layer, which forms when the metallic material is electrochemically dissolved, and is used to form fine dynamic pressure-generating grooves in a fluid dynamic bearing.

In such a method of forming dynamic pressure generation grooves in a fluid dynamic bearing, positive current is applied to a bearing member in which dynamic pressure-generating grooves are to be formed, negative current is applied to an electrode tool in which a conductive pattern corresponding to the dynamic pressure-generating grooves is formed, and a high-pressure electrolyte flows between the bearing member and the electrode tool, thereby the dynamic pressure-generating grooves are electrochemically etched in the bearing member in the form of the conductive pattern.

Therefore, in order to conduct the electrochemical machining, a conductive pattern must be formed in an electrode tool in the form of dynamic pressure-generating grooves, and the electrode tool must not be abraded by a high-pressure electrolyte, and must be electrochemically durable.

SUMMARY OF THE INVENTION

Accordingly, the present invention has been made keeping in mind the above problems occurring in the prior art, and the present invention provides an electrode tool, which is not abraded by a high-pressure electrolyte and is electrochemically durable because its conductive pattern, corresponding to dynamic pressure-generating grooves, is formed to have a lower height than a nonconductive insulating layer and a conductive layer is formed on the conductive pattern, and a method of manufacturing the electrode tool.

In an aspect, the present invention provides an electrode tool for electrochemical machining, which is used to form fine grooves in the surface of a workpiece to which positive current is applied, including: an electrode substrate on which a conductive pattern is formed to have protrusions corresponding to the fine grooves and to which negative current is applied; a nonconductive insulating layer covering the entire top surface of the electrode substrate, excluding the conductive pattern; and a conductive layer, which is formed on the conductive pattern to protect the conductive pattern, and the top surface of which is the same height as the top surface of the nonconductive insulating layer.

Here, the conductive pattern of the electrode substrate may be formed to have a lower height than the nonconductive insulating layer.

Further, the conductive layer may be formed only on the top surface of the conductive pattern.

Alternatively, the conductive layer may be integrally formed on the top surface and lateral side of the conductive pattern.

Here, the conductive layer may be an insoluble metal plated layer made of gold, platinum or iridium having high electroconductivity.

In another aspect, the present invention provides a method of manufacturing an electrode tool for electrochemical machining, including: forming a conductive pattern on an electrode substrate such that the conductive pattern corresponds to fine grooves which are to be formed in the surface of a workpiece; forming a nonconductive insulating layer on the electrode substrate such that the nonconductive insulating layer covers the entire top surface of the electrode substrate to prevent the top surface of the conductive pattern from being exposed; polishing the nonconductive insulating layer to expose the top surface of the conductive pattern; etching the conductive pattern such that the top surface of the conductive pattern is stepped to be lower than the top surface of the nonconductive insulating layer; and forming a conductive layer on the top surface of the etched conductive pattern.

Here, in the etching of the conductive pattern, the conductive pattern may be etched through chemical etching.

Further, in the etching of the conductive pattern, the conductive pattern may be etched by applying positive current to the electrode substrate and then electrochemically machining the conductive pattern.

Further, in the forming of the conductive layer, the conductive layer may be formed such that the top surface of the conductive layer is the same height as the top surface of the nonconductive insulating layer.

Further, the conductive layer may be an insoluble metal plated layer made of gold, platinum or iridium, having high electroconductivity.

In a further aspect, the present invention provides a method of manufacturing an electrode tool for electrochemical machining, including: forming a conductive pattern on an electrode substrate such that the conductive pattern corresponds to fine grooves which are to be formed in the surface of a workpiece; forming a conductive layer on the electrode substrate such that the conductive layer covers the entire upper portion of the electrode substrate, including the top surface and lateral side of the conductive pattern; forming a nonconductive insulating layer on the conductive layer such that the nonconductive insulating layer covers the entire top surface of the conductive layer to prevent the conductive layer formed on the conductive pattern from being exposed; and polishing the nonconductive insulating layer to expose the conductive layer formed on the conductive pattern.

Here, in the polishing of the nonconductive insulating layer, the nonconductive insulating layer may be polished such that the top surface of the conductive layer is the same height as the top surface of the nonconductive insulating layer.

Further, the conductive layer may be an insoluble metal plated layer made of gold, platinum or iridium having high electroconductivity.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
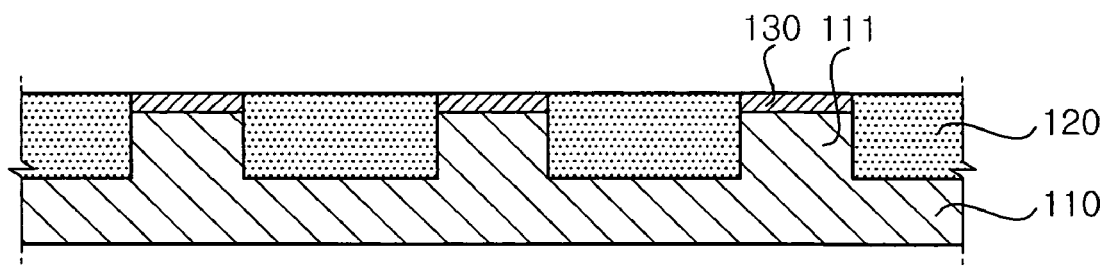
FIG. 1 is a schematic sectional view showing an electrode tool for electrochemical machining according to a first embodiment of the present invention.

Hereinafter, preferred embodiments of the present invention will be described in detail with reference to the attached drawings.

Reference now should be made to the drawings, in which the same reference numerals are used throughout the different drawings to designate the same or similar components.

Figure 2:
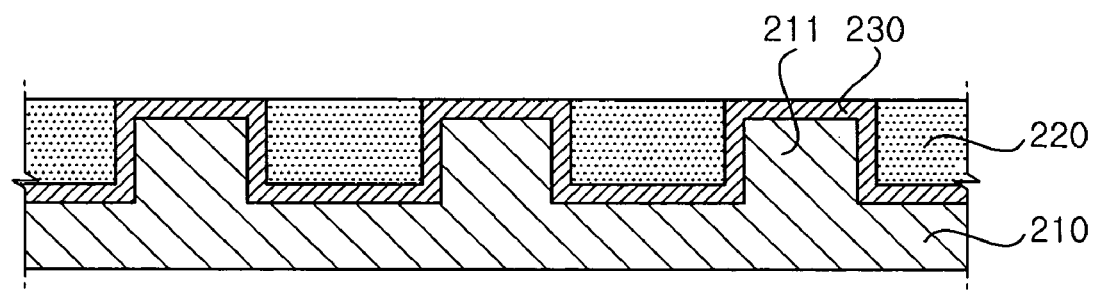
FIG. 2 is a schematic sectional view showing an electrode tool for electrochemical machining according to a second embodiment of the present invention.

As shown in FIGS. 1 and 2, an electrode tool 100 includes an electrode substrate 110, a nonconductive insulating layer 120 and a conductive layer 130, and an electrode tool 200 includes an electrode substrate 210, a nonconductive insulating layer 220 and a conductive layer 230.

The electrode substrate 110 has the nonconductive insulating layer 120 and the conductive layer 130 placed thereon, and the electrode substrate 210 has the nonconductive insulating layer 220 and the conductive layer 230 placed thereon. Each of the electrode substrates 110 and 210 may be made of aluminum or aluminum alloy or may be made of iron or iron alloy, but the present invention is not limited thereto.

The electrode substrate 110 is formed thereon with a conductive pattern 111 corresponding to dynamic pressure-generating grooves in a fluid dynamic bearing, and the electrode substrate 210 is formed thereon with a conductive pattern 211 corresponding to the dynamic pressure-generating grooves in the fluid dynamic bearing. The process of forming each of the conductive patterns 111 and 211 will be described in detail below.

When cathode current is applied to each of the conductive patterns 111 and 211 at the time of electrochemical machining, dynamic pressure-generating grooves are formed in a bearing member facing each of the conductive patterns 111 and 211. In this case, the conductive patterns 111 and 211 may be formed to have lower heights than the respective nonconductive insulating layers 120 and 220. More specifically, the conductive pattern 111 and 211 are formed thereon with additional conductive layers 130 and 230, respectively, in order to prevent the abrasion of the conductive patterns 111 and 211 and thus increase the durability thereof. In this case, the conductive pattern 111 and 211 may be stepped to be lower than the nonconductive insulating layers 120 and 220, respectively, such that the top surfaces of the conductive layers 130 and 230 are the same height as those of the nonconductive insulating layers 120 and 220, respectively.

The nonconductive insulating layers 120 and 220 serve to prevent an electrochemical reaction from occurring in the portions excluding the conductive pattern 111 and 211, and are formed on the respective electrode substrates 110 and 210 such that only the conductive patterns 111 and 211 are exposed.

The conductive layers 130 and 230 are formed on the respective conductive patterns 111 and 211, and thus serve to prevent the abrasion or corrosion of the conductive patterns 111 and 211 and thus increase the durability thereof. Further, the conductive layers 130 and 230 are formed to cover the top surfaces of the respective conductive patterns 111 and 211, stepped to be lower than the respective nonconductive insulating layers 120 and 220. In this case, the top surfaces of the conductive layers 130 and 230 may be the same height as those of the nonconductive insulating layers 120 and 220, respectively. Here, each of the conductive layers 130 and 230 may be an insoluble metal plated layer made of gold, platinum, iridium or the like, and, in the embodiments of the present invention, each of the conductive layers 130 and 230 is a gold plated layer having excellent electrochemical machinability.

Hereinafter, the above electrode tools 100 and 200 according to preferred embodiments of the present invention will be described in detail with reference to FIGS. 1 and 2.

As shown in FIG. 1, the electrode tool 100 for electrochemical machining according to a first embodiment of the present invention includes an electrode substrate 110, a conductive pattern 111 formed on the electrode substrate 110 through etching, electrochemical machining or physical machining, and a nonconductive insulating layer 120 covering the conductive pattern 111 such that only the top surface of the conductive pattern 111 is exposed.

In this case, the top surface of the conductive pattern 11 is stepped to be lower than the top surface of the nonconductive insulating layer 120, and a gold plated layer 130 is formed on the top surface of the conductive pattern 111.

According to the first embodiment of the present invention, since the top surface of the gold plated layer 130 is the same height as that of the nonconductive insulating layer 120, it is possible to prevent the gold plated layer 130 from peeling even when a high-pressure electrolyte flows onto the top surface of the gold plated layer 130.

The method of manufacturing the electrode tool 100 according to the first embodiment of the present invention will be described in more detail with reference to FIGS. 3 to 8 below.

As shown in FIG. 2, the electrode tool 200 for electrochemical machining according to a second embodiment of the present invention includes an electrode substrate 210, a conductive pattern 211 formed on the electrode substrate 110 through etching, electrochemical machining or physical machining, and a gold plated layer 230 completely covering the top surface of the electrode substrate 210.

That is, in the second embodiment of the present invention, unlike the first embodiment of the present invention, the gold plated layer 230 is formed on the lateral side of the conductive pattern 211 as well as on the top surface of the conductive pattern 211 and part of the electrode substrate 210, on which a nonconductive insulating layer 220 is to be formed.

The nonconductive insulating layer 220 is formed on the electrode substrate 210 such that the conductive pattern 211, on which the gold plated layer is formed, is exposed. In this case, the top surface of the gold plated layer 230 formed on the conductive pattern 211 may be the same height as the top surface of the nonconductive insulating layer 220.

According to the second embodiment of the present invention, since the top surface of the gold plated layer 230 is the same height as that of the nonconductive insulating layer 220 and the gold plated layer 230 is integrally formed on the top surface and later side of the conductive pattern 211, it is possible to prevent the gold plated layer 230 from peeling even when a high-pressure electrolyte flows onto the top surface of the gold plated layer 230.

A method of manufacturing the electrode tool 200 according to the second embodiment of the present invention will be described in more detail with reference to FIGS. 9 to 13 below.

Figure 3:
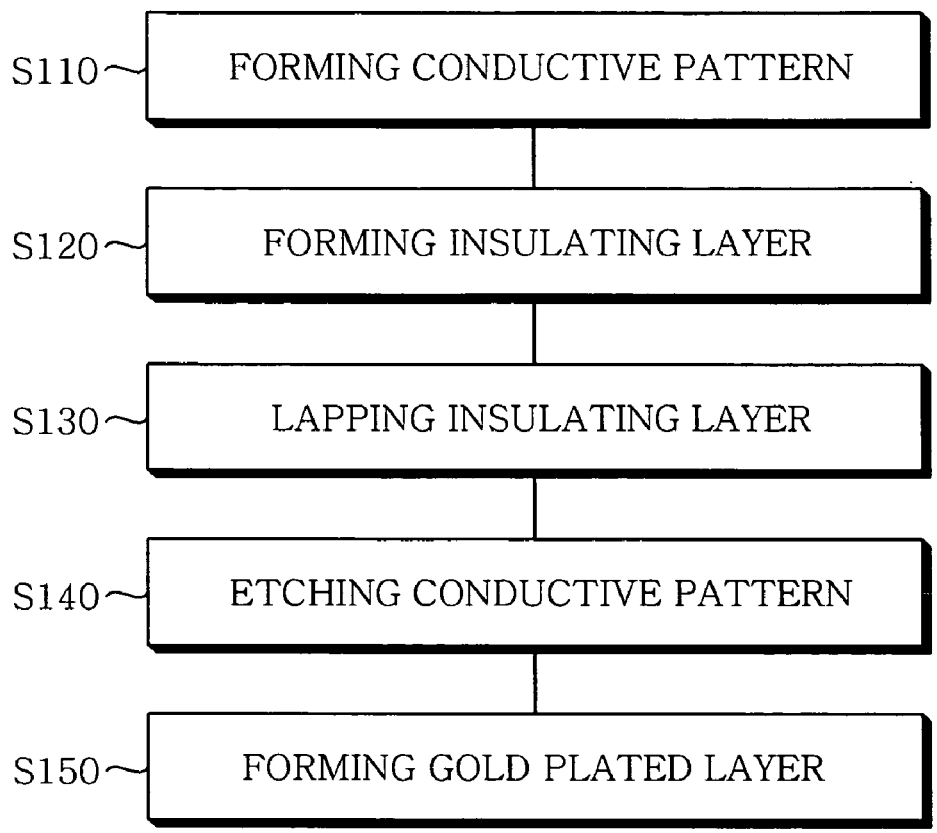
FIG. 3 is a schematic flow chart showing a method of manufacturing the electrode tool of FIG. 1.

FIG. 3 is a flow chart showing a method of manufacturing the electrode tool 100 according to a first embodiment of the present invention, and FIGS. 4 to 8 are sectional views showing the method of sequentially manufacturing the electrode tool based on the flow chart of FIG. 3.

Figure 4:
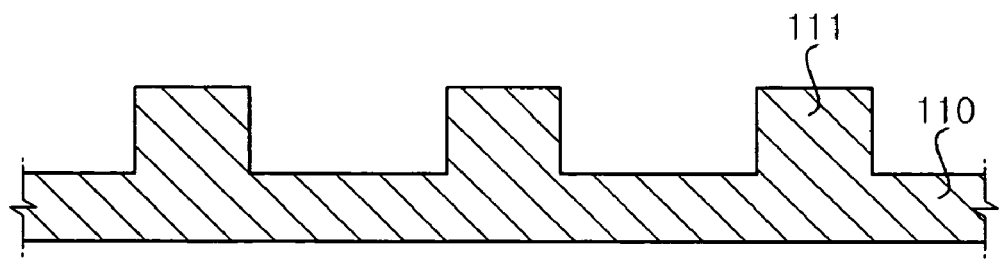
FIGS. 4 to 8 are sectional views sequentially showing the method of manufacturing the electrode tool based on the flow chart of FIG. 3.

First, as shown in FIG. 4, a conductive pattern 111 is formed on an electrode substrate 110. In this case, the conductive pattern 111 may be formed by etching a part of the electrode substrate 110, excluding the conductive pattern 111, through a chemical method. In addition, the conductive pattern 111 may also be formed by physically treating the electrode substrate 110. Here, the conductive pattern 111 is formed such that it corresponds to dynamic pressure-generating grooves in a fluid dynamic bearing (S110).

Figure 5:
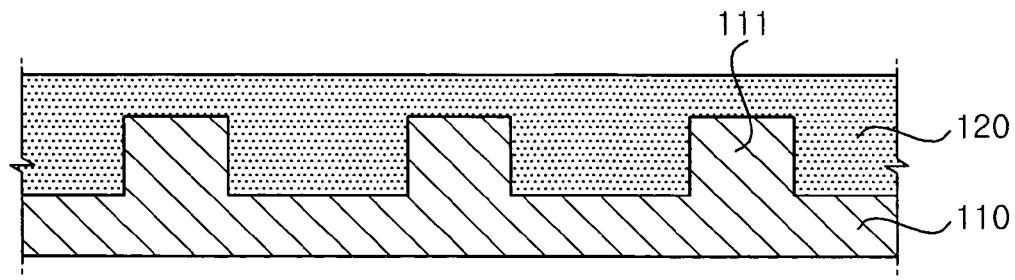

Subsequently, as shown in FIG. 5, the entire top surface of the electrode substrate 110 is covered with a nonconductive insulating layer 120. That is, the nonconductive insulating layer 120 is formed such that it also completely covers the conductive pattern 111 formed on the electrode substrate 110 (S120).

Figure 6:
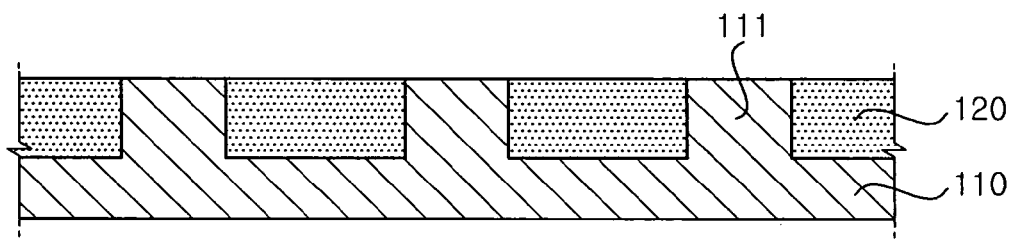

Subsequently, as shown in FIG. 6, the nonconductive insulating layer 120 formed on the top surface of the electrode substrate 110 is polished to expose the top surface of the conductive pattern 111. In this case, the polishing of the nonconductive insulating layer 120 may be conducted through physical polishing, that is, lapping (S130).

Figure 7:
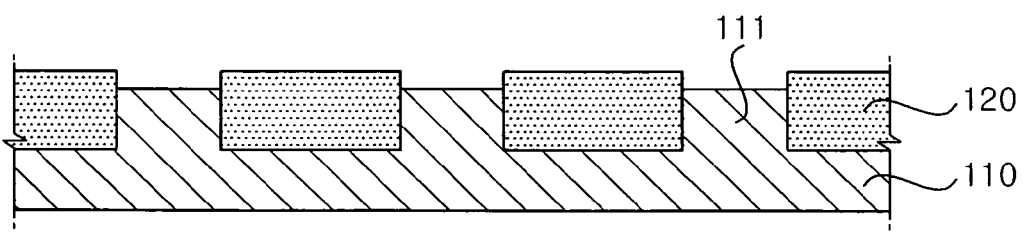
Figure 8:
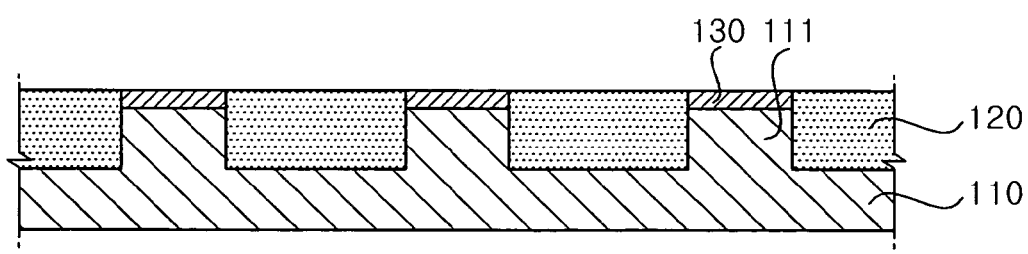

Subsequently, as shown in FIG. 7, the conductive pattern 111 is etched such that the top surface of the conductive pattern 111 is stepped to be lower than the top surface of the nonconductive insulating layer 120. In this case, the etching of the conductive pattern 111 may be conducted through chemical etching or electrochemical machining (ECM). More specifically, the conductive pattern 111 may be chemically etched by applying an etchant on the nonconductive insulating layer 120 or by forming an additional mask over the nonconductive insulating layer 120 and then applying an etchant on the nonconductive insulating layer 120. In addition, the conductive pattern 111 may be etched by applying positive current to the electrode substrate 110 (S140).

Finally, as shown in FIG. 7, a gold plated layer 130 is formed on the conductive pattern 111, which is stepped to be lower than the nonconductive insulating layer 120. In this case, the top surface of the gold plated layer 130 is the same height as the top surface of the nonconductive insulating layer 120 to prevent the gold plated layer 130 from peeling (S150).

Figure 9:
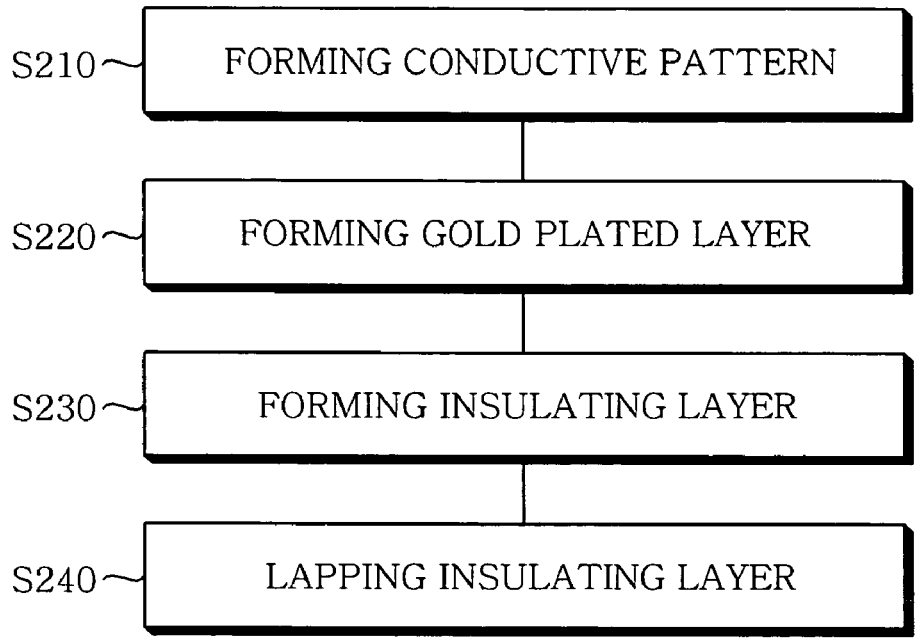
FIG. 9 is a schematic flow chart showing a method of manufacturing the electrode tool of FIG. 2.

FIG. 9 is a flow chart showing a method of manufacturing the electrode tool 200 according to a second embodiment of the present invention, and FIGS. 10 to 13 are sectional views showing the method of sequentially manufacturing the electrode tool based on the flow chart of FIG. 9.

Figure 10:
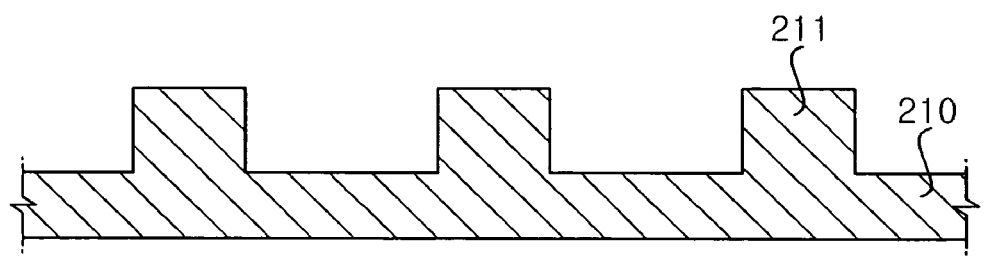
FIGS. 10 to 13 are sectional views sequentially showing the method of manufacturing the electrode tool based on the flow chart of FIG. 9.

First, as shown in FIG. 10, a conductive pattern 211 is formed on an electrode substrate 210. In this case, the conductive pattern 211 may be formed by etching a part of the electrode substrate 210, excluding the conductive pattern 211, through a chemical method. In addition, the conductive pattern 211 may also be formed by physically treating the electrode substrate 210 (S210).

Figure 11:
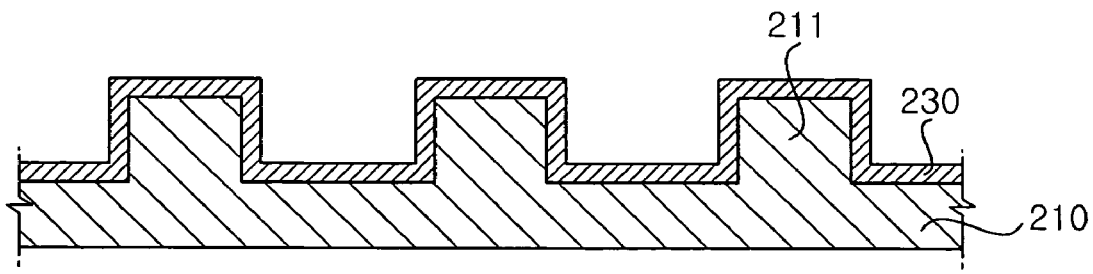

Subsequently, as shown in FIG. 11, the entire top surface of the electrode substrate 210 is covered with a gold plated layer 230. That is, the gold plated layer 230 is formed such that it completely covers the conductive pattern 211 formed on the electrode substrate 210 (S220).

Figure 12:
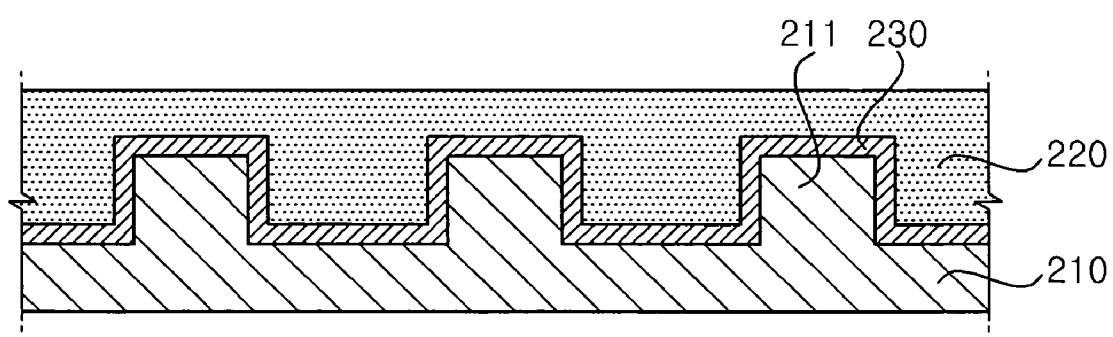

Subsequently, as shown in FIG. 12, the entire top surface of the electrode substrate 210 covered with the gold plated layer 230 is covered with a nonconductive insulating layer 220. That is, the nonconductive insulating layer 220 is formed such that it completely covers the gold plated layer 230 formed on the conductive pattern 211 (S230).

Figure 13:
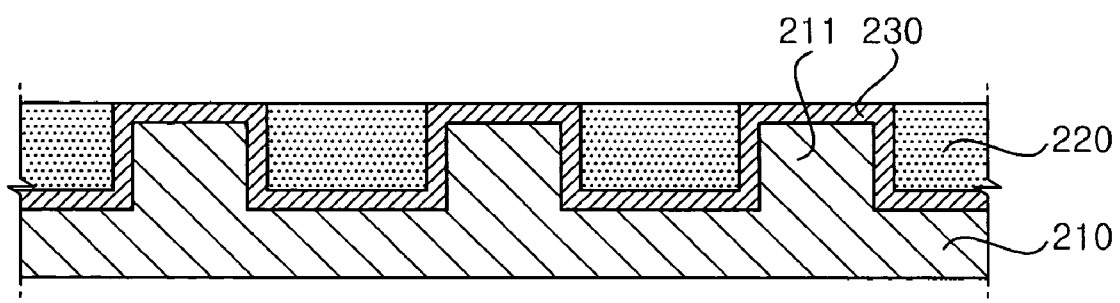

Subsequently, as shown in FIG. 13, the nonconductive insulating layer 220 formed on the conductive pattern 211 is polished to expose the top surface of the conductive pattern 111, that is, the top surface of the gold plated layer 230 formed on the conductive pattern 211. In this case, since the top surface of the gold plated layer 230 is the same height as that of the nonconductive insulating layer 220 and the gold plated layer 230 is integrally formed on the top surface and lateral side of the conductive pattern 211, it is possible to prevent the gold plated layer 230 from peeling (S240).

As described above, although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing an electrode tool for electrochemical machining, comprising:
    forming a conductive pattern having a protruding shape on an electrode substrate such that the conductive pattern corresponds to fine grooves which are to be formed in a surface of a workpiece;
    forming a nonconductive insulating layer on the electrode substrate such that the nonconductive insulating layer covers up an entire top surface of the electrode substrate to prevent a top surface of the conductive pattern from being exposed;
    polishing the nonconductive insulating layer to expose the top surface of the conductive pattern;
    etching only the exposed conductive pattern such that the conductive pattern is formed to have a lower height than the nonconductive insulating layer; and
    forming a conductive layer on the top surface of the etched conductive pattern.

2. The method of manufacturing an electrode tool for electrochemical machining according to claim 1, wherein, in the etching the conductive pattern, the conductive pattern is etched through chemical etching.

3. The method of manufacturing an electrode tool for electrochemical machining according to claim 1, wherein, in the etching the conductive pattern, the conductive pattern is etched by applying positive current to the electrode substrate and then electrochemically machining the conductive pattern.

4. The method of manufacturing an electrode tool for electrochemical machining according to claim 1, wherein, in the forming the conductive layer, the conductive layer is formed such that the top surface of the conductive layer is the same height as the top surface of the nonconductive insulating layer.

5. The method of manufacturing an electrode tool for electrochemical machining according to claim 1, wherein the conductive layer is an insoluble metal plated layer made of gold, platinum or iridium, having high electroconductivity.

* * * * *